United States Patent
Wu

(10) Patent No.: US 6,530,682 B2
(45) Date of Patent: Mar. 11, 2003

(54) STRUCTURE MULTI-CUT TYPE LAMP PIPE CONNECTOR COMPONENTRY

(76) Inventor: Wen-Chang Wu, No. 10, Lane 191, Hsi Hsin Street, Chuang Ya Tsun, Hsiu Shui Hsiang, Chang Hua Hsien (TW)

( * ) Notice: Subject to any disclaimer, the term of this patent is extended or adjusted under 35 U.S.C. 154(b) by 92 days.

(21) Appl. No.: 09/794,350

(22) Filed: Feb. 28, 2001

(65) Prior Publication Data

US 2002/0118536 A1 Aug. 29, 2002

(51) Int. Cl.$^7$ .............................. F21S 8/08; F16L 21/00
(52) U.S. Cl. ...................... 362/413; 362/382; 285/401; 285/402
(58) Field of Search ................................. 362/219, 418, 362/413, 285, 382; 403/348; 285/401, 360, 376, 402; 411/553, 549, 15; 248/161, 410, 423

(56) References Cited

U.S. PATENT DOCUMENTS

| | | | |
|---|---|---|---|
| 366,014 A | * 7/1887 | C. Maschmeyer | .......... 248/410 |
| 3,816,882 A | * 6/1974 | Maeda et al. | ................ 411/549 |
| 4,558,893 A | * 12/1985 | Shelly | .......................... 285/401 |
| 5,149,149 A | * 9/1992 | Wu | .............................. 285/401 |
| 5,713,608 A | * 2/1998 | Yang | ........................... 285/402 |

* cited by examiner

Primary Examiner—Sandra O'Shea
Assistant Examiner—Bao Truong

(57) ABSTRACT

A connecting element of a multi-sectional lamp tube comprises a locking ring, a mounting joint, a threaded tube, and a fixing ring. The locking ring has a hollow bottom end and a though hole. Two sides of the through hole of the locking ring are installed with respective slots. A stopper is formed at a side of the through hole. Each of the two sides of the top ring has the buckling blocks. The buckling blocks pass through the slots of the locking ring. Then, the mounting joint is rotated and is gradually tightened against a ramp surfaces of the locking ring so as to resist against the stopper. An upper lamp tube is welded at an outer periphery of an assembled locking ring and a lower map tube is welded at an outer periphery of the fixing ring.

3 Claims, 5 Drawing Sheets

FIG3-A

STRUCTURE MULTI-CUT TYPE LAMP PIPE CONNECTOR COMPONENTRY

BACKGROUND OF THE INVENTION

1) Field of the Invention

The invention herein relates to an improved structure multi-cut type lamp pipe connector componentry in which since there is a slot and a stop block at each of the two sides of a lock ring through-hole as well as respectively formed catch blocks matching the alignment of the slot positions in a top circlet of the lock ring, this provides for the smooth insertion of the mounting joint catch blocks into the lock ring slots; after insertion, the mounting joint is rotated to position the mounting joint onto the lock ring; furthermore, as the mounting joint is rotated, the catch blocks are gradually tightened against the lock ring ramp surfaces and engaged on the lock ring stop block, thereby securely positioning the mounting joint; and since the rotational angle of the mounting joint is approximately 90 degrees, the lamp pipe cord at the interior section of the threaded tube is not rotated along with the threaded tube, thereby preventing the lamp pipe cord from becoming twisted out of shape; as such, simple assembly, installation, and positioning is achieved and, furthermore, the lamp pipe cord is protected from being deformed.

2) Description of the Prior Art

Most conventional multi-cut type lamp pipes consist of upper and lower lamp pipe sections, the interior and exterior annular surfaces of which are connected and then fastened into position by directly disposed female and male threads; however, since the said tubular structures must have compatible threads, this is only suitable for round pipes and cannot be utilized for pipes of other polygonal shapes; as a result, the industry researched and developed another type of connector arrangement capable of conjoining upper and lower lamp pipe sections of any shape by directly gluing into the inner ring a female threaded sleeve and a projecting threaded rod having male thread, the male threaded projecting rod was fastened to the female thread to conjoin the upper and lower lamp pipe sections; however, since lamp pipe structures assembled using this conjoinment method involve the rotation of the threaded rod, the lamp cord in the interior section of the threaded rod also rotated along and was easily twisted out of shape in the process, causing a short circuit in the lamp cord.

In view of the said shortcomings, the inventor of the invention herein conducted research which culminated in the successful development of the invention herein.

SUMMARY OF THE INVENTION

The primary objective of the invention herein is to provide an improved structure multi-cut type lamp pipe connector componentry, with the said connector componentry comprised of a lock ring, a mounting joint engaged to the bottom end of the lock ring, a threaded tube fastened at the interior section of the mounting joint, and a nut fastening a fixing ring at the bottom end of the mounting joint; since there is a slot and a stop block at each of the two sides of the lock ring through-hole and the respectively formed catch blocks match the alignment of the slot positions in the top circlet of the lock ring, this provides for the smooth insertion of the mounting joint catch blocks into the lock ring slots; after insertion, the mounting joint is rotated to position the mounting joint onto the lock ring; furthermore, as the mounting joint is rotated, the catch blocks are gradually tightened against the lock ring ramp surfaces and engaged on the lock ring stop block, thereby securely positioning the mounting joint.

Another objective of the invention herein is to provide an improved structure multi-cut type lamp pipe connector componentry in which since the rotational angle of the mounting joint is approximately 90 degrees, when the mounting joint is positioned onto the lock ring, the small rotational angle of the mounting joint is such that the lamp pipe cord at the interior section of the threaded tube is not rotated along with the threaded tube, thereby preventing the lamp pipe cord from becoming twisted out of shape and precluding a short circuit in the lamp cord.

BRIEF DESCRIPTION OF THE DRAWINGS

FIG. 3-A is a cross-sectional drawing of the lamp pipe following assembly.

DETAILED DESCRIPTION OF THE INVENTION

Figure 1:
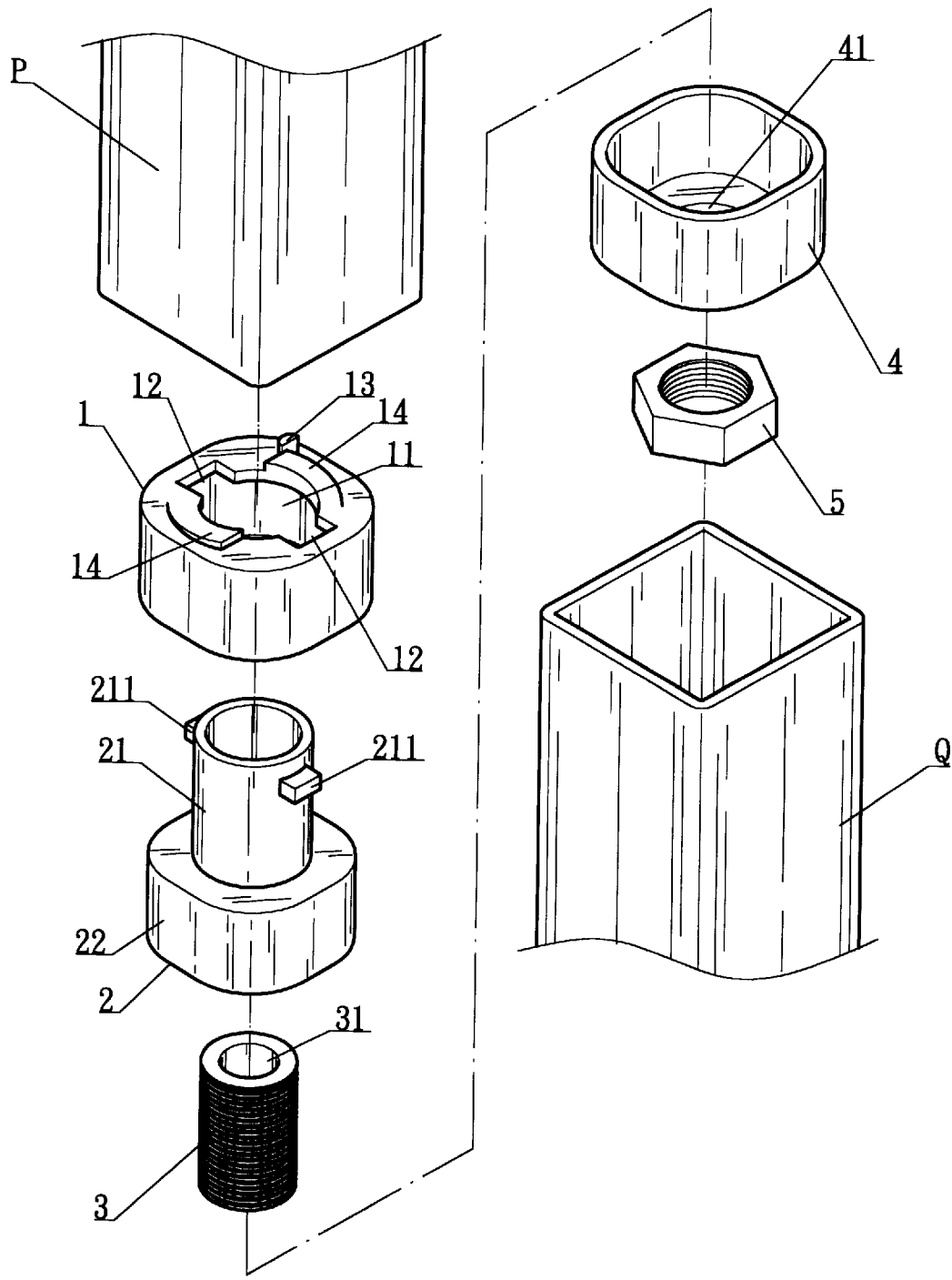
FIG. 1 is an exploded drawing of a polygonal lamp pipe and connector componentry.
Figure 2:
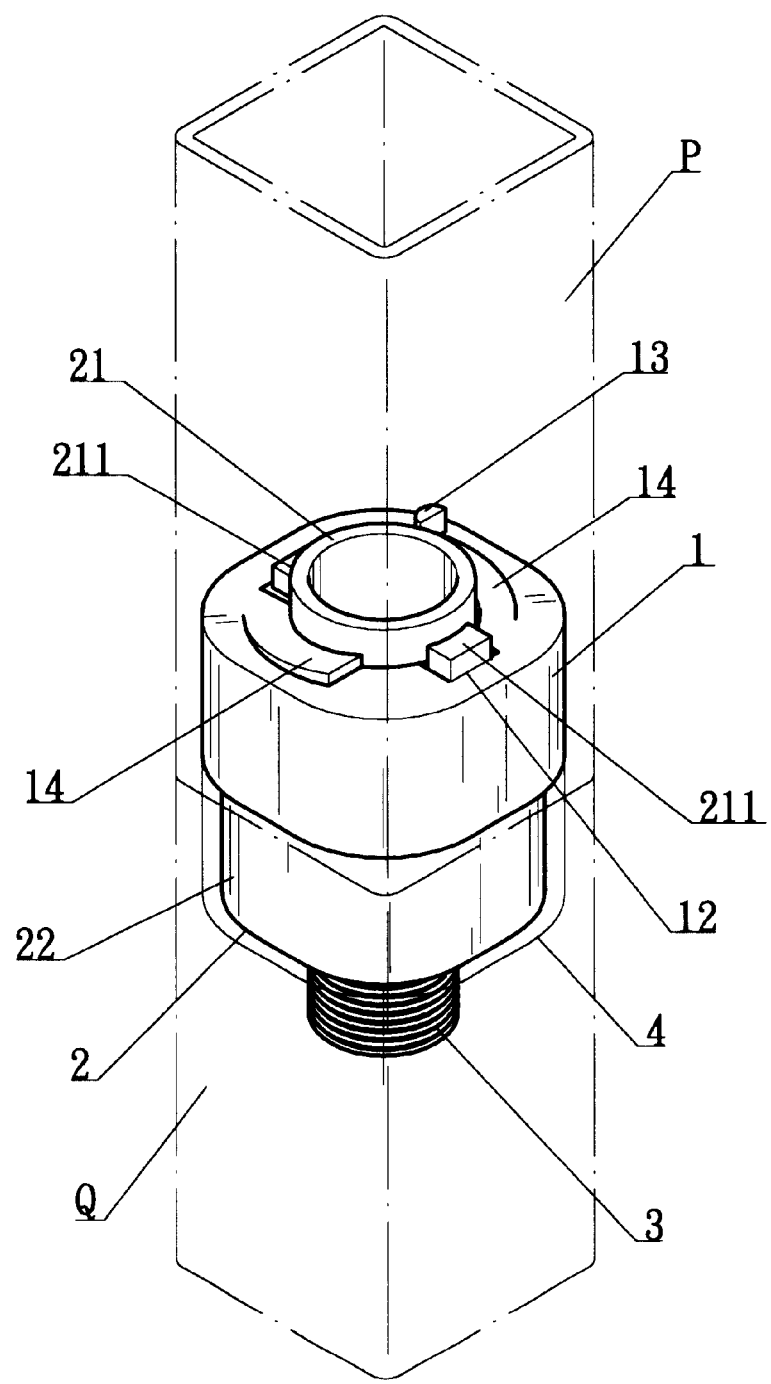
FIG. 2 is an exploded drawing of the polygonal lamp pipe and connector componentry.
Figure 3:
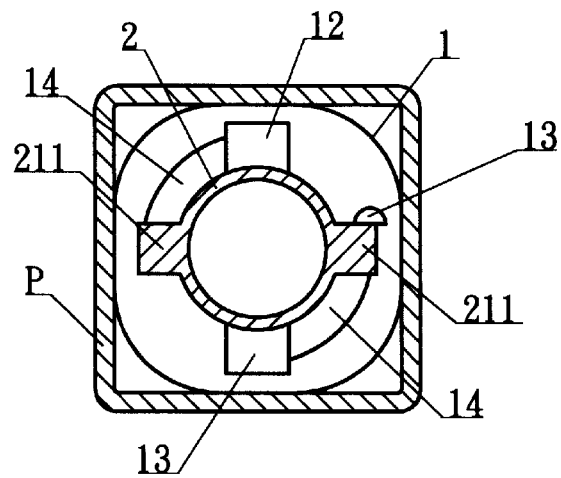
FIG. 3 is a cross-sectional drawing of the polygonal lamp pipe and connector componentry.
Figure 3:
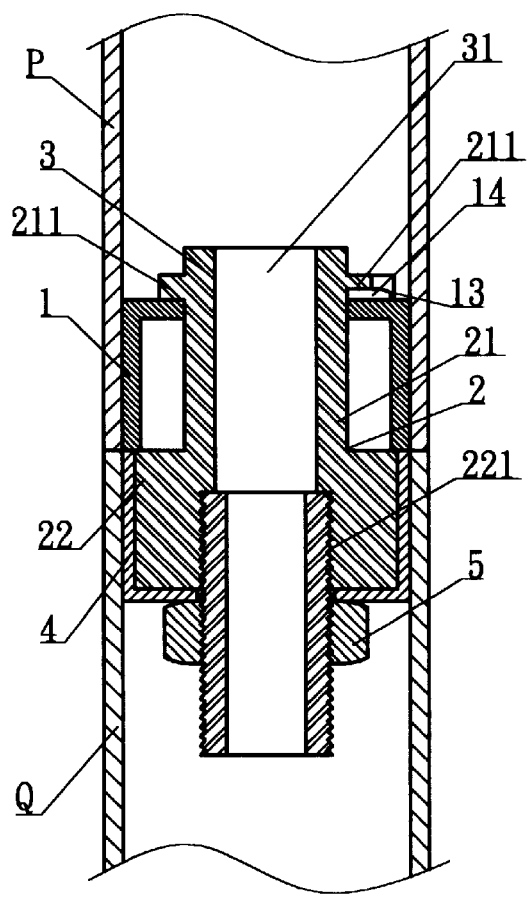

Referring to FIG. 2 and FIG. 3, the structural arrangement of the present invention, the invention herein is an improved structure multi-cut type lamp pipe connector componentry with the said connector componentry comprised of a lock ring 1, a mounting joint 2 engaged to the bottom end of the lock ring, a threaded tube fastened at the interior section of the mounting joint 2, and a nut 5 fastening a fixing ring 4 at the bottom end of the mounting joint 2, wherein:

The said lock ring 1 is of a tubular shape matching that of the lamp pipe and is an annular structure having a hollow bottom end and a through-hole 11 formed in the top end and, furthermore, extending along each of the two sides of the lock ring 1 through-hole 11 is a slot 12 that provides for the insertion and securing of mounting joint 2 catch blocks 211; punched formed at the side of the lock ring 1 through-hole 11 is a stop block 13 that provides for the positional limiting of the catch blocks 211; the said stop block 13 is first precisely situated according to the angular design of the lamp pipe such that after the upper and lower lamp pipe sections P and Q are rotated into an interfitted conjoinment, the pipes are in a state of angular alignment; on the rotational path of the catch blocks 211 on the lock ring 1 are slightly inclined ramp surfaces 14 that provide for the gradual tightened positioning of the catch blocks 211.

The said mounting joint 2 is T-shaped tubular structure and, furthermore, has a bottom ring 22 matching the outer shape of the lamp pipe and a female threaded surface 221 along the interior section of the bottom portion; at each of the two sides of a top circlet 21 of the mounting joint 2 and aligned with the lock ring 1 slots 12 are catch blocks 211 that provide for the smooth insertion of the mounting joint 2 top circlet 21 into the through-hole 11 of the lock ring 1, and after insertion, the mounting joint 2 is rotated to enable the positioning of the mounting joint 2 on the lock ring 1; furthermore, when the said mounting joint 2 is rotated, its catch blocks 211 are gradually tightened against the lock ring 1 ramp surfaces 14 and engaged on the lock ring 1 stop block 13, the reinforced positioning of the mounting joint 2 being such that the mounting joint 2 does not rotate without an application of force.

The said threaded tube 3 is fastened to the female threaded surface 221 in the mounting joint 2 bottom ring 22, the threaded tube 3 also having disposed in its center a through-hole 31 that provides for the insertion of the lamp pipe cord to prevent the lamp pipe cord from being rotated along with the mounting joint 2.

The fixing ring 4 is an annular structure consisting of a top end that is hollow and a bottom end having a through-hole 41; after the threaded tube 3 is inserted in the bottom end of the fixing ring 4, the nut 5 is fastened to the bottom end of the fixing ring 4, and the fixing ring 4 is secured at the bottom end of the mounting joint 2.

Figure 4:
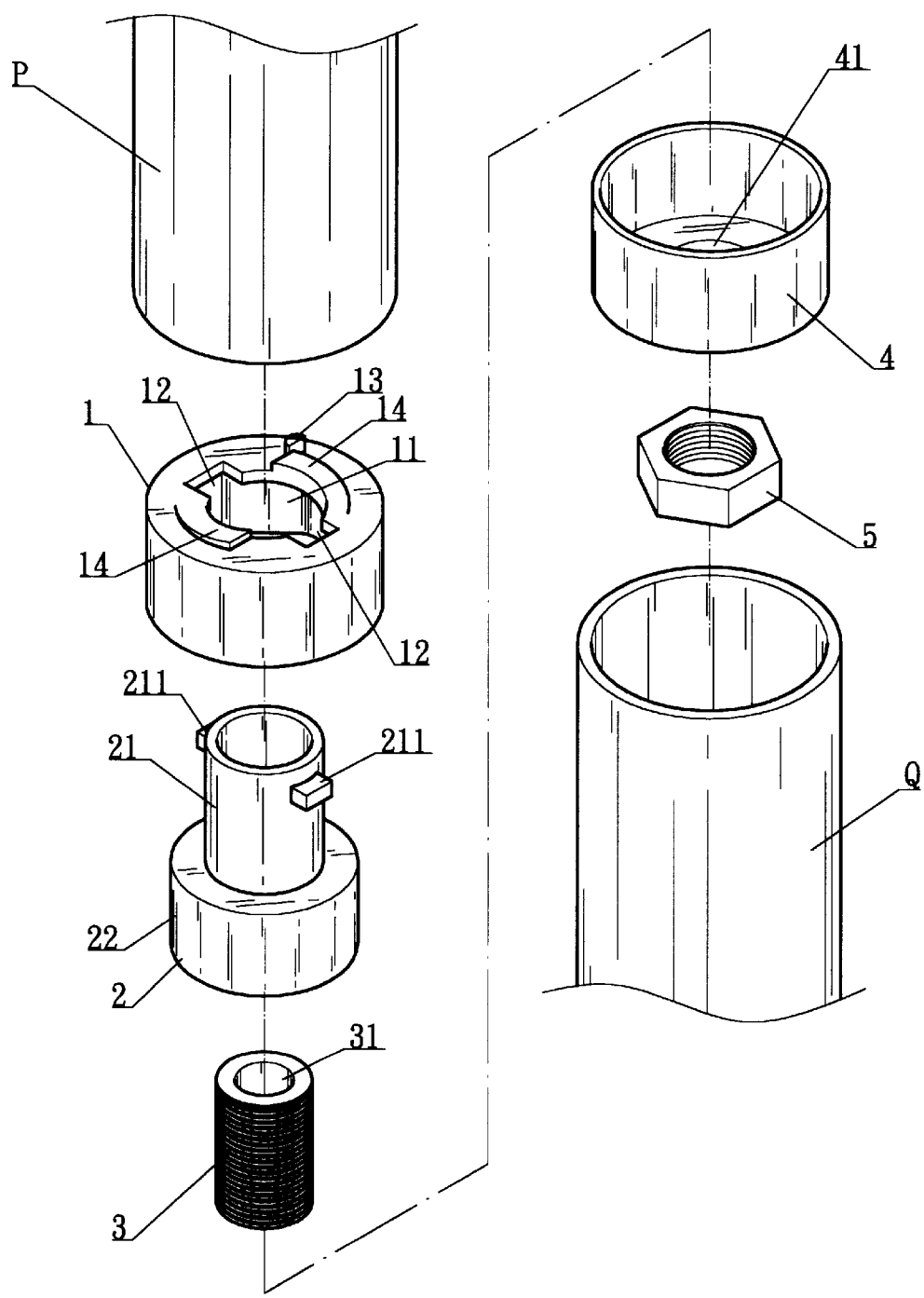
FIG. 4 is an exploded drawing of a circular lamp pipe and connector componentry.
Figure 5:
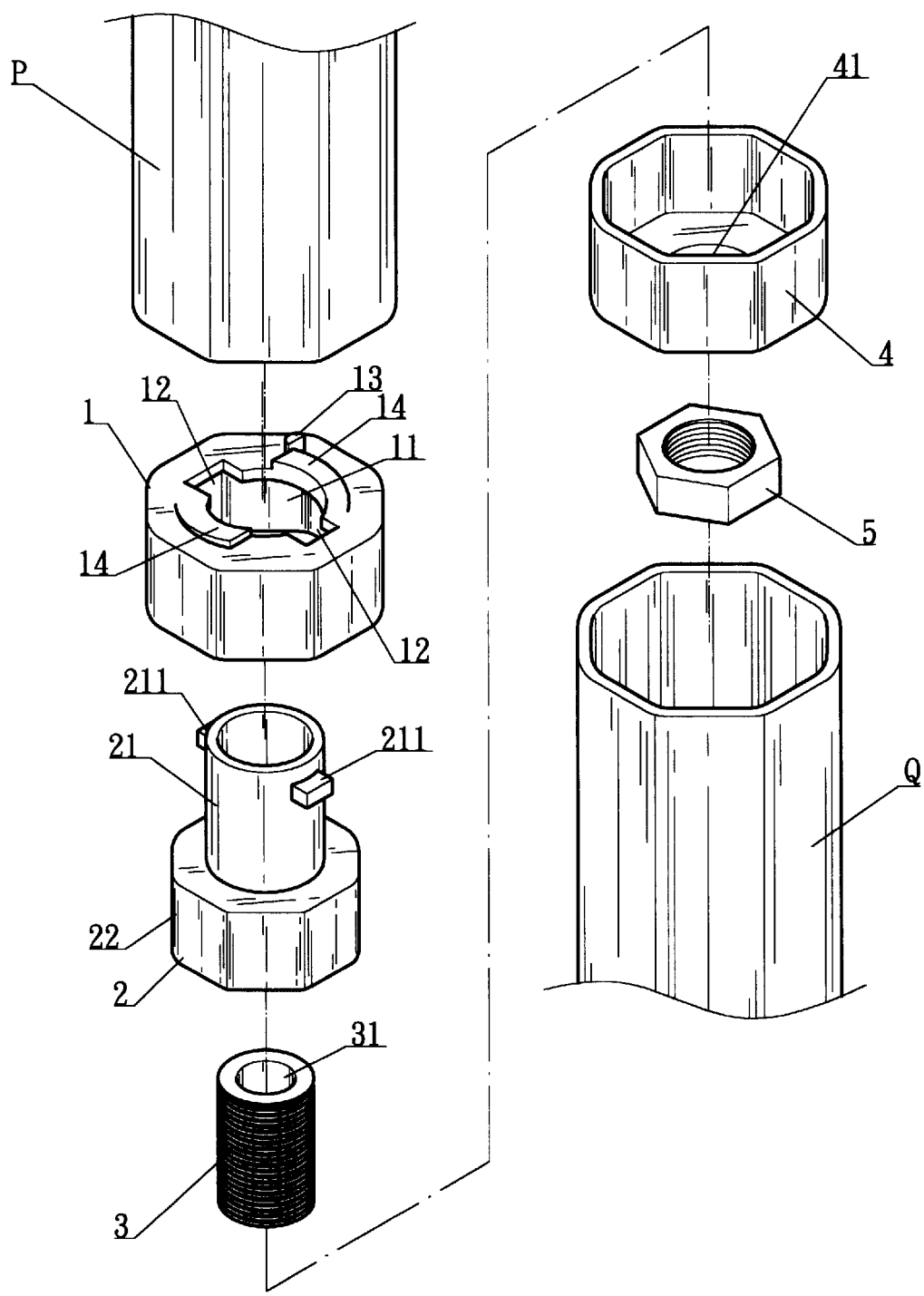
FIG. 5 is an exploded drawing of a differently shaped lamp pipe and connector componentry.

Referring to FIG. 3, FIG. 4, and FIG. 5, the assembly and installation method of the invention herein is clearly understandable and consists of inserting the mounting joint 2 catch blocks 211 into the lock ring 1 slots 12, the mounting joint 2 is positioned at the lock ring 1 bottom end, the threaded tube 3 is then fastened to the mounting joint 2 bottom end, the fixing ring 4 is sleeved over the threaded tube 3 bottom end and, furthermore, the fixing ring 4 is placed against the lock ring 1 bottom section, the nut 5 is then fastened onto the threaded tube 3 bottom, and the lock ring 1 is positioned at the mounting joint 2 bottom end and; after completion of a multi-cut type lamp pipe connector componentry set, the lock ring 1 is placed on the outer periphery of the upper lamp pipe section P and the fixing ring 4 is placed on the outer periphery of the lower lamp pipe section Q; the upper and lower lamp pipe sections can be of any desired shape and the connector componentry matched to any shape of lamp pipe section.

As such, of the said connector components, the mounting joint 2, the threaded tube 3, and the fixing ring 4 are rotated along the lower lamp pipe section Q and the lock ring 1 is rotated along the upper lamp pipe section P; thus, after the mounting joint 2 top circlet 21 is inserted into the lock ring 1 through-hole 11, the rotation of the mounting joint 2 enables the positioning of the mounting joint 2 at the lock ring 1; furthermore, when the said mounting joint 2 is rotated, its catch blocks 211 are gradually tightened against the lock ring 1 ramp surfaces 14 and engaged on the lock ring 1 stop block 13, the positioning of the mounting joint 2 being such that the mounting joint 2 does not rotate without an application of force and, thereby, fixes the conjoinment angle of the upper and lower pipe sections P and Q.

What is claimed is:

1. A connecting element of a multi-sectional lamp tube comprising a locking ring, a mounting joint engaged to a bottom end of the locking ring, a threaded tube fastened at an interior section of the mounting joint and a center of which is capable of being inserted by a lamp tube cord, and a fixing ring locked to a lower end of the mounting joint by a nut; wherein:

the locking ring has an opened bottom end and a though hole at a top end thereof; two sides of the though hole of the locking ring are formed with respective slots, a stopper is formed at a side of the through-hole of the locking ring; the stopper is precisely situated according to the orientation and shape of the lamp tube;

the mounting joint has a female threaded surface at a lower inner section; each of the two sides of the top ring has respective buckling blocks respective the slots of the locking ring; the buckling blocks pass through the slots of the locking ring and then is limited by the stopper; furthermore, after the buckling blocks passes the though hole, the mounting joint is rotated and is gradually tightened against a ramp surfaces of the locking ring so as to resist against the stopper;

an upper lamp tube is welded at an outer periphery of an assembled locking ring and a lower map tube is welded at an outer periphery of the fixing ring;

thereby, the lamp tube is assembled and positioned easily and thus the tamp tube cord does not deform.

2. The connecting element of a multi-sectional lamp tube as claimed in claim 1, wherein the locking ring and a lower ring section of the mount joint has a ring-like structures which are matched to a shape of the lamp tube.

3. The connecting element of a multi-sectional lamp tube as claimed in claim 1, wherein the fixing ring has a hollow top section and a though hole at a lower end thereof; after the fixing ring is inserted into the threaded tube from a lower end thereof, the fixing ring is locked by a nut so that the fixing ring is positioned at a lower end of the mounting joint.

* * * * *